Sept. 29, 1964  J. R. TIPTON  3,151,196
METHOD OF MAKING BALLS
Filed Aug. 8, 1960  5 Sheets-Sheet 1

INVENTOR.
JAMES R. TIPTON
BY
ATTORNEY

Sept. 29, 1964  J. R. TIPTON  3,151,196
METHOD OF MAKING BALLS
Filed Aug. 8, 1960  5 Sheets-Sheet 2

INVENTOR.
JAMES R. TIPTON
BY
ATTORNEY

Sept. 29, 1964   J. R. TIPTON   3,151,196
METHOD OF MAKING BALLS
Filed Aug. 8, 1960   5 Sheets-Sheet 3

INVENTOR.
JAMES R TIPTON
BY
ATTORNEY

Sept. 29, 1964   J. R. TIPTON   3,151,196
METHOD OF MAKING BALLS
Filed Aug. 8, 1960   5 Sheets-Sheet 4

INVENTOR.
JAMES R. TIPTON
BY
ATTORNEY

Sept. 29, 1964  J. R. TIPTON  3,151,196
METHOD OF MAKING BALLS
Filed Aug. 8, 1960  5 Sheets-Sheet 5

INVENTOR.
JAMES R. TIPTON
BY
ATTORNEY

United States Patent Office 3,151,196
Patented Sept. 29, 1964

3,151,196
METHOD OF MAKING BALLS
James R. Tipton, Ashland, Ohio, assignor to Eagle Rubber Co., Inc., Ashland, Ohio, a corporation of Delaware
Filed Aug. 8, 1960, Ser. No. 48,059
4 Claims. (Cl. 264—302)

This invention relates to the manufacture of hollow balls and the like from plastisols such as vinyl plastisols; for example, play balls and the like. The balls may be spherical or they may be ovoid as footballs, for example; and the outer surface may be perfectly smooth or it may be pebbled or carry any other design.

The process employed is a modification of the usual procedure followed in the so-called slush-casting method in which a heated mold is filled with a plastisol and the plastisol adjacent the mold surface is gelled by the heat of the mold, and later fused. The invention includes several improvements in this process.

Although described more particularly in connection with the use of a vinyl plastisol other plastisols may be used. By a plastisol is meant a flowable suspension of plastic particles in a plasticizer which is dissolved by the particles when the plastisol is heated. Products produced from vinyl plastisols are fused, as a final step in their preparation. Products produced from plastisols of other plastics need not be fused, and the fusion step disclosed is practiced only when desirable.

It has previously been proposed to slush-cast a plastisol in a heated mold by first filling a heated mold and then pouring ungelled plastisol from the mold, leaving a gelled deposit on the mold wall. This has been found unsatisfactory because where the excess plastic is poured over the rim of the mold a deposit of the gel forms which causes various difficulties. To prevent the formation of such a deposit and to keep the rim of the mold perfectly clean, according to this invention the excess plastic is removed from the mold by suction. Each mold half is filled somewhat more than level full of the plastisol, forming a meniscus over the top level of the mold. A pipe connected with a vacuum pump is then lowered into the mold and the excess plastisol is removed through this pipe without forming any deposit over the rim of the mold. The two halves of the mold are then brought into contact and they seat perfectly against one another because the rims are maintained in a deposit-free condition. They are brought together as soon as possible after removal of excess plastisol, while the gelled plastisol deposits are still soft and unfused and will unite with each other.

When the two mold halves are brought together, the gelled deposits of the plastisol which protrude slightly above the top edge of the mold walls are brought together and form a seam with negligible increase in the thickness of the gelled plastisol. The union of the two gelled deposits in this manner is such that on subsequent fusing, an inseparable fused seal is formed. Although there is sometimes a slight thickening of the plastic at the seam, there is not a sufficient local increase in weight to appreciably affect the balance of the ball.

It has been found that if the mold is heated uniformly, when the mold is filled with the plastisol and the ungelled plastisol away from the mold surface is quickly removed, the deposit of gelled plastisol is substantially thicker in the bottom of the mold than at its rim, because the dwell of the plastisol adjacent the hot mold surface is substantially less at the rim than at the bottom of the mold. This is largely or entirely overcome by heating the rim of the mold hotter than the bottom of the mold, with a gradation in the temperature from the rim to the bottom of the mold, and then filling the mold with plastisol, causing that adjacent the heated mold to gel, and emptying ungelled plastisol from the mold. The gradation of temperature from the rim to the bottom of the mold is coordinated in a general way with the time the plastisol at different levels in the mold is in contact with the heated mold surface during the filling and emptying of the mold in order to form a substantially uniform deposit of the plastisol over the mold surface. It is necessary to heat the rim to a higher temperature because the dwell of the plastisol in contact with the mold during filling and emptying is less at the rim than at the bottom of the mold and also because heat radiates from the rim faster than from any other part of the mold.

The process is advantageously carried out on a continuous basis and can be entirely or largely automatic. It is best adapted to a wheel operation on a horizontal plane, although the molds may be moved differently, as in a vertical plane. Using a flat wheel, a large number of molds are used and the wheel is advantageously rotated intermittently, stopping each pair of mold halves at the several stations in sequence for performing the different operations required. The open mold is first passed under heating means, preferably in a heating tunnel, where the separated mold halves are heated, preferably in an upright position. The rims of the molds are heated to a higher temperature than the mold bottoms. The heated open molds are passed to the filling station where plastisol is introduced into each half, dwells for approximately one minute to allow the plastisol next to the mold to gel, and then the molds move to the vacuum station where excess plastisol is removed from each. Valve means is inserted in one of the halves for inflation of the molded ball. The two halves are then brought together, the mold is passed through a fusing tunnel or the like to complete the fusing of the plastisol (if vinyl or other plastisol that requires fusing), then through a cooling chamber, and then opened for removal of the finished ball. Unless the molds are cooled before being opened, the balls will expand and possibly burst when the mold is opened, due to the fact that in the fusion chamber where the vinyl plastic is fused, the air contained in each ball is heated so that if the mold is opened immediately the ball will expand to a size greater than its intended volume.

The invention is further described in connection with the accompanying drawings, in which—

Figure 1:
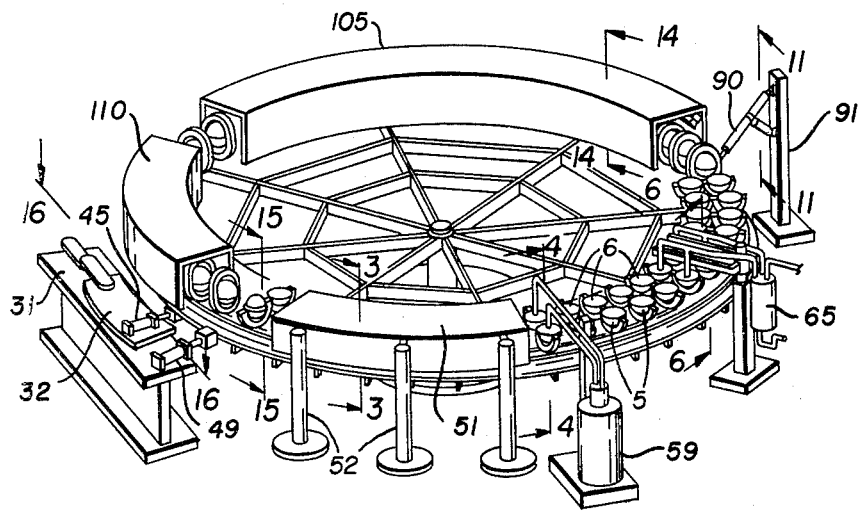
FIG. 1 is an isometric view of wheel equipment for the continuous manufacture of balls.
Figure 4:
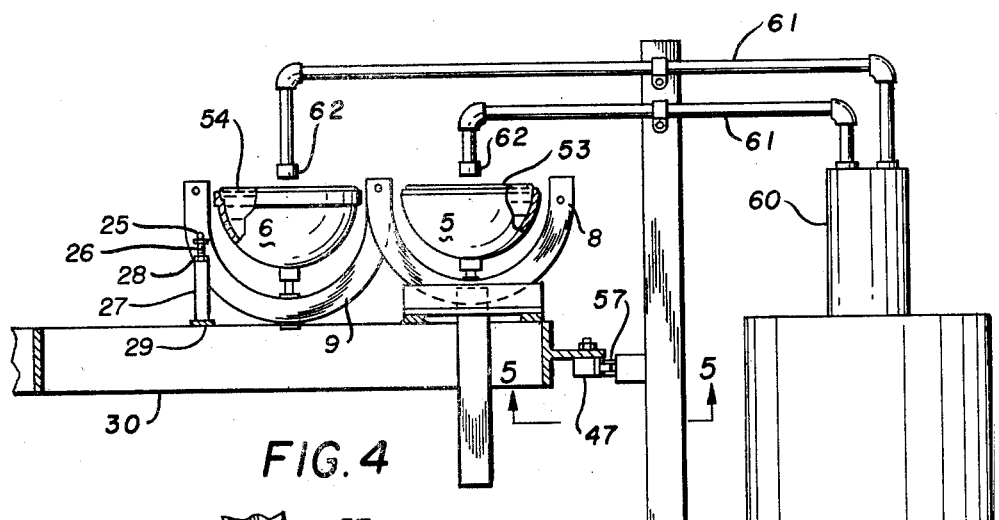
FIG. 4 is a section on the line 4—4 of FIG. 1 showing plastisol being introduced into the two mold halves.

To simplify the illustration, means is shown for handling plastisol of only one color. Where two-tone balls are to be made with each half a different color, the equipment shown in FIGURES 1 and 4 for storing and measuring plastisol will be duplicated with the feed lines for delivering the plastisol to the different halves each connected to a different source of supply. Also, different storage facilities will be provided (FIGURES 1 and 6) for the differently colored plastisols removed from the different mold halves. The showing of such duplicate equipment would complicate and confuse the drawings.

Figure 2:
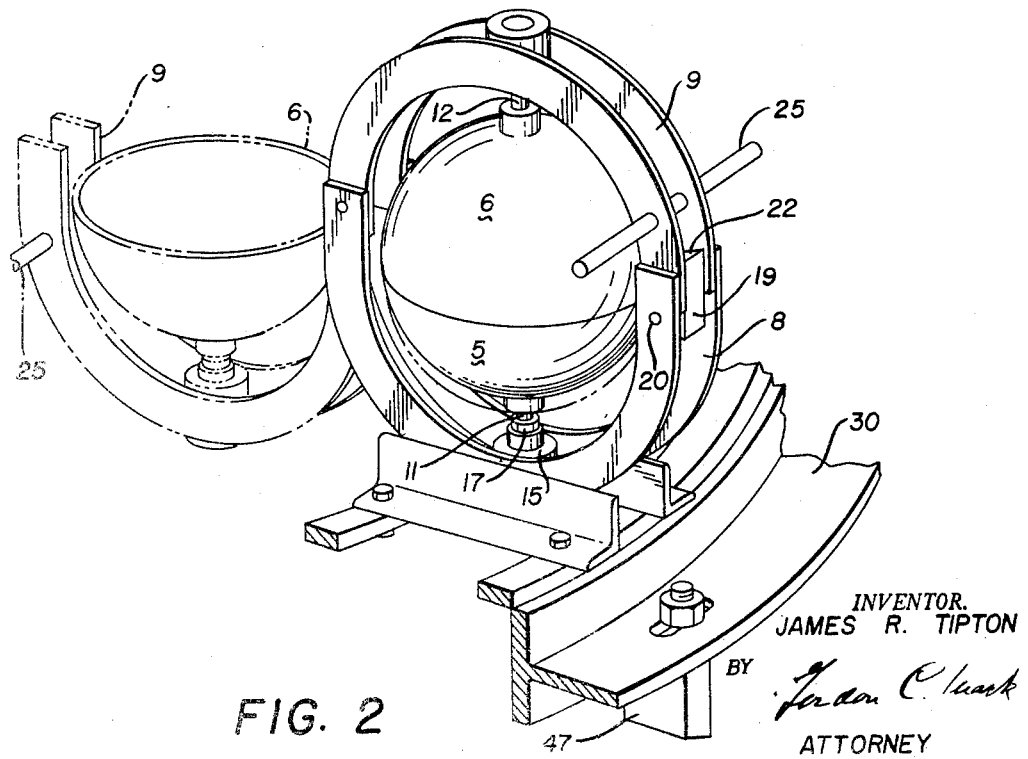
FIG. 2 is a detail showing a closed mold in full lines, and also showing in dot-dash lines the top half of the opened mold.

The mold shown in the drawings is formed of two halves 5 and 6, each half being held in one of the halves 8 and 9 of the mold fixture. The mold halves are preferably made of aluminum for fast heating and cooling. The respective halves have matable openings and the rims of the halves at these openings are planar. The mold halves are supported by the respective spindles 11 and 12. The spindle 11 is movable vertically within the member 15 so that when open the rims of the two halves can be brought into the same horizontal plane. A locknut 17 (FIGURES 2 and 8) fixes the location of the lower mold half so that when raised in the fixture (as will be explained) it is brought into precise mating relation with the upper mold half. The upper mold half may be made similarly adjustable, if desired, or the height of the burners within the heating tunnel may be made adjustable.

Figure 3:
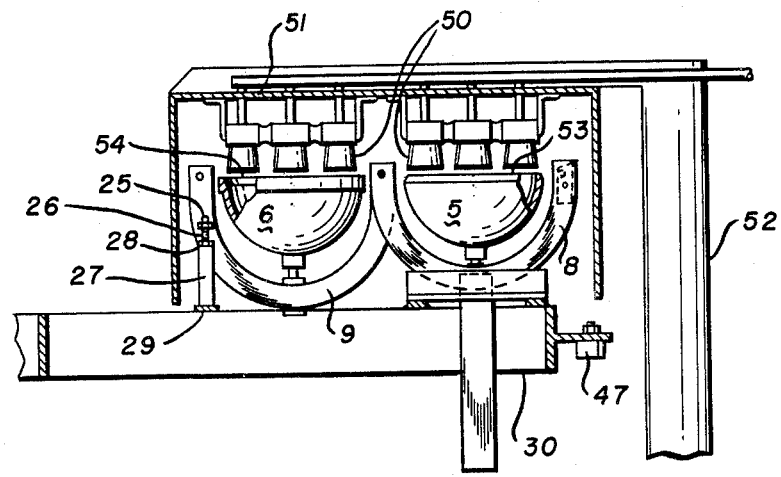
FIG. 3 is an elevation in detail on the line 3—3 of FIG. 1, showing the opened mold passing through the pre-heating chamber.

The two mold halves are held together by a catch 19 pivoted on the pin 20. The bottom 21 of the catch (FIGURE 11) is weighted so that the catch is always kept upright. The top edge 22 of the catch is beveled, and the catch embraces the stud 24. When the two mold halves are swung together in their respective frame halves, the stud 24, acting on the beveled surface 22, pushes the top of the catch aside so that the stud becomes engaged in the catch. When the two halves are to be opened for removal of a finished ball, the operator can easily move the weighted end 21 inwardly to unlatch the catch and then open the two halves with the aid of the long pin 25, or the catch can be moved automatically and automatic means can be provided for opening the mold. The fixture half 8 is fixed permanently on the wheel. The half 9 which is hinged to the half 8 is supported in the open position (FIGURE 3) by the pin 25 which rests on the member 26 threaded in the standard 27 and held at an adjusted height by the locknut 28. The standard is supported on the ring 29. By such means the two halves are held perfectly level in the open position.

The height of the rim of each half of the mold is carefully located so that the rims of the two halves are in the same plane when the two halves pass through the pre-heating tunnel, and both halves are heated to the same temperature.

Figure 16:
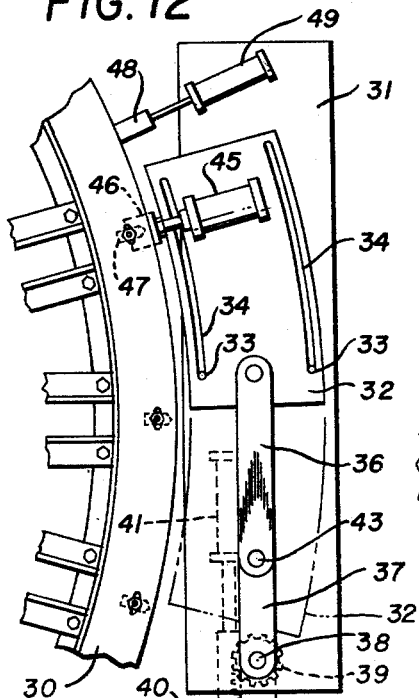
FIG. 16 is a plan view of the wheel-rotating means on line 16—16 of FIG. 1.

The wheel is rotated intermittently preferably by mechanism in which the rotation starts slowly, rises to a maximum, and then slows down again before stopping so as not to cause the plastisol in the mold halves to wet the rims. Suitable equipment is indicated in FIGURE 16. The table 31 supports the slide 32 which is reciprocated back and forth with the pins 33 fastened to the table moving in the slots 34. The slide 32 is shown in the forward position in full lines, and its position in the retracted position is indicated in dot-dash lines. The slide is moved by the lever arm 36 which is reciprocated by the rotatable arm 37 mounted on the spur shaft 38. The spur gear 39, fastened to the shaft, is reciprocated by the rack 40 which is attached to the piston of the cylinder 41. At each complete stroke of the piston the spur is moved first in one direction and then the other, causing the arm 37 to execute a 180-degree movement to the position indicated in dot-dash lines, and then return. The circular movement of the pivot 43 causes the lever 36 to move the slide 30 first slowly, then more rapidly, and then to slowly bring it to a stop.

Figure 5:
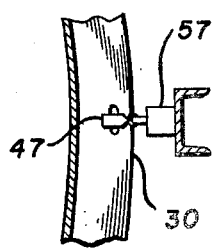
FIG. 5 is a detail of the bottom of the wheel showing the trip means for actuating the various pieces of equipment located around the wheel.

The cylinder 45 is provided with a piston to which the notched plate 46 is attached. The notch is V-shaped and cooperates with the angled edge of each block 47 in succession to bring the block to a halt with the equipment mounted on the wheel in register with the filling, suction, etc. equipment mounted around the wheel. The blocks 47 are fastened in elongated slots (FIGURE 5) so that they can be positioned with extreme accuracy.

The brake block 48 is mounted on the piston rod of the cylinder 49 and bears against the edge of the wheel 30.

The operation of the cylinders 41, 45 and 49 is so timed that the notch in the plate 46 is moved away from each block 47 just before the slide starts movement, and is returned just as the slide comes to rest, and the cylinder 49 applies the brake block 48 to the wheel also just as the wheel comes to rest.

The open mold halves are first passed under the gas burners 50 (FIGURE 3) within the shield 51 (referred to herein as the pre-heating tunnel) supported by the support members 52. The rims 53 and 54 of the mold halves move close to the gas burners and are heated to a higher temperature than the bottoms of the molds. The radiant heat from the gas burners heats the mold halves much more rapidly than they can be heated by convection. Any suitable method of heating may be employed. On leaving the pre-heating tunnel, the temperature of each mold half is graduated from a higher temperature at the rim to a lower temperature at the bottom of the mold half.

From the pre-heating tunnel the mold halves are moved to the filling station. Here the block 47 (FIGURE 4) trips the switch 57 which actuates the filling means. This includes a storage tank 59 for the plastisol and a pump and metering mechanism within the container 60. Here the exact amount of plastisol is delivered through the pipes 61 and antidrip valves 62 into the respective mold halves. The valves are adjusted to open when pressure is exerted by the supply means (within the container 60) and close without dripping when this pressure drops. The flow of plastisol from the pipes 61 may start before the mold halves are brought to a halt, and may not be terminated until after the mold halves are again in motion.

As the plastisol is filled into the mold halves the bottoms are first covered and the level of the plastisol rises to the rims. The amount introduced into each mold half is so accurately measured that a meniscus is formed above the rim of each mold half. The time interval involved in filling the mold halves is appreciable, and it is because the dwell of the plastisol is contact with the rim of the mold is appreciably less than the dwell in the bottom of the mold (due both to the fact that the top of the mold is filled after the bottom, and is later emptied before the bottom) that the top of the mold is heated to a higher temperature than the bottom of the mold within the pre-heating tunnel 51.

Figure 6:
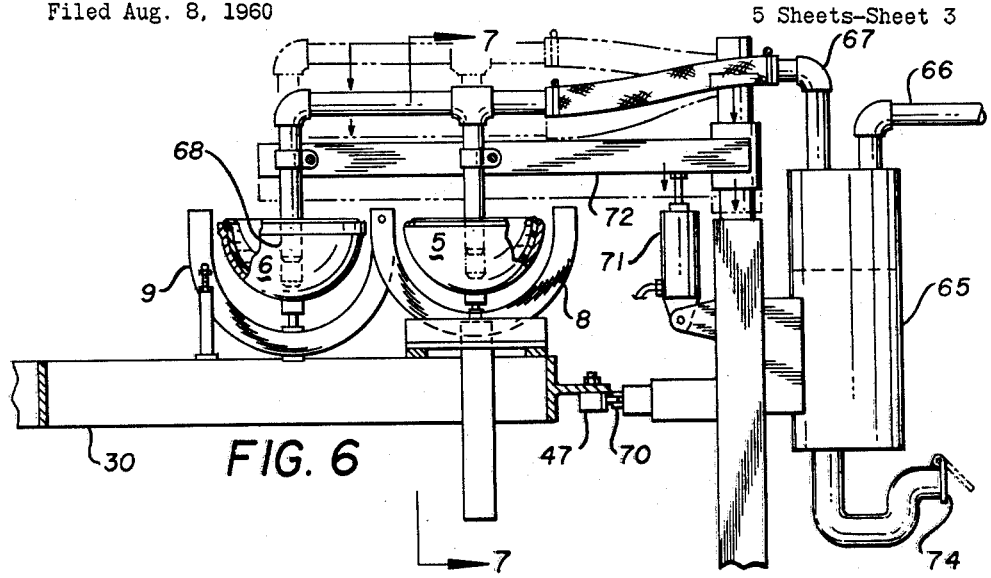
FIG. 6 is a detail on the line 6—6 of FIG. 1 showing an elevation of means for suction-removal of the excess plastisol from the mold halves.
Figure 7:
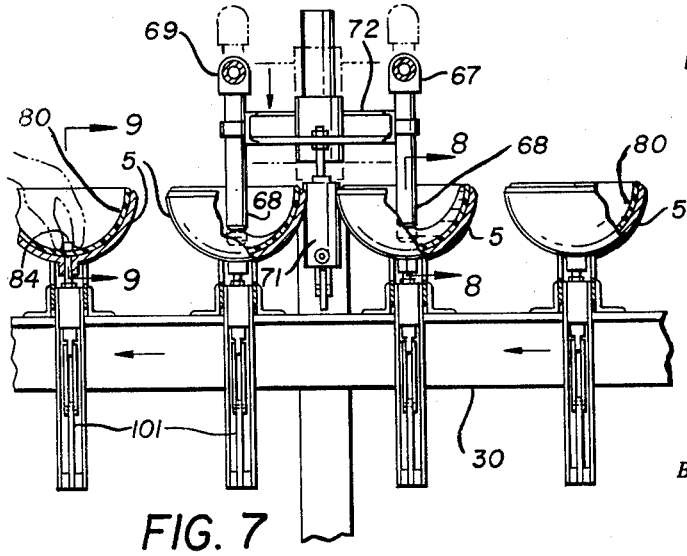
FIG. 7 is a view on the line 7—7 of FIG. 6 showing the dual equipment provided for this purpose.

After adequate dwell of the plastisol within the mold halves, they arrive at the suction stations. The means for removal of the excess plastisol is shown in FIGURES 6 and 7.

There are two suction stations. The mold half is sucked substantially dry at the first station, but there is still some plastisol adhering to the deposit on the mold half. Unless this is removed, it drains to the bottom of the mold and the wall of the bottom of the mold is sufficiently thickened to throw the ball out of balance. It is therefore desirable to provide a second suction station. It need not immediately follow the first suction station. Here there is sucked from the mold any liquid that drains to the bottom of the mold after removal of the first suction device. The suction is preferably sufficiently strong to remove this without making contact between the suction nozzle and the plastisol deposit.

The drawings show the two suction devices at adjacent stations. A single storage tank 65 is provided, connected with a vacuum line 66 which leads to a vacuum pump (not shown). An additional tank with duplicate suction means is provided for the manufacture of two-tone balls. There are two sets of suction lines shown from the storage tank to the mold halves, the line 67 (FIGURES 6 and 7) being connected with nozzles 68 at the first suction station and the line 69 (FIGURE 7) connected with identical nozzles at the second suction station.

Figure 8:
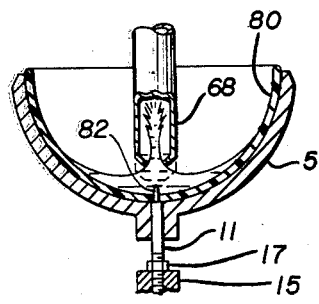
FIG. 8 is a detail showing the suction removal of plastisol from a partially emptied mold.

When the block 47 trips the switch 70 at the first suction station, suitable mechanism (not shown) energizes the cylinder 71, lowering the cross bar 72 which supports both suction lines 67 and 69. The nozzles 68 connected with the lines 67 and 69 do not reach to the bottom of the mold. They are lowered into the mold halves and are operative before the mold halves come to rest and may continue to operate until after the motion of the mold halves is resumed. The suction is sufficient to draw the plastisol from the mold without the nozzle contacting it, although in the early stages of the withdrawal of the plastisol the nozzles are preferably immersed in the plastisol. This is illustrated in FIGURE 8 which shows how the mold halves are emptied without the nozzles contacting the plastisol deposit on the wall of the mold. The suction at the nozzle prevents drip from within or without the nozzle. By preventing contact between the nozzle and the gelled deposit, there is no danger of damage to the deposit.

There is a separate switch 70 at each suction station. It actuates timing mechanism which operates the cylinder 71 to first lower and then raise the cross bar 72. The nozzles connected with pipes 67 and 69 are lowered into successive pairs of mold halves. At the second station any plastisol which has drained to the bottom of the mold after it leaves the first station, is removed. The plastisol is withdrawn to the storage tank 65 and is automatically discharged through the valve 74 as the amount in the tank exceeds the amount that can be held by the vacuum pump.

Figure 9:
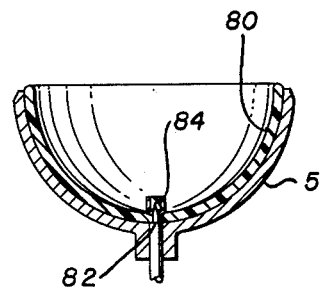
FIG. 9 shows a valve plug in place on a pin within the mold half.
Figure 10:
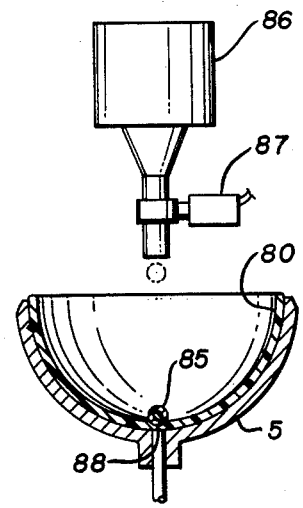
FIG. 10 shows alternative means for introducing a valve plug.

It is necessary to provide a valve in the wall of the ball to be punctured with the inflating needle used in inflating the finished ball. This valve may be supplied manually or automatically. For manual application of a valve, one mold half of each pair is provided with a pin 82 (FIGURE 8). This is advantageously provided at the bottom of the mold half. Then, after the excess plastisol has been sucked from the mold half, a plastic valve 84 (of soft self-sealing plastic that will cure to the gelled plastisol, e.g. acrylic ester copolymer or a vinyl composition) is placed manually on the pin. This is illustrated in FIGURE 9. It is not necessary to use a pin to locate the valve. A round valve 85 may be dropped from a hopper 86 by valve means operated by the cylinder 87 actuated by a switch tripped by the block 47, as illustrated in FIGURE 10. The valve will roll to the bottom of the mold half, and its position is marked by the slight indentation in the ball surface produced by the point 88. Such valves cure to the gelled plastisol in the fusion furnace without pressure.

Figure 13:
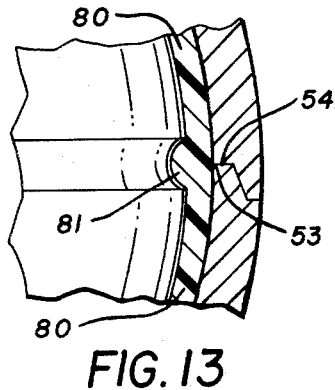
FIG. 13 is a similar detail section showing the halves closed.

The heat of each mold half gels the plastisol that is in contact with it, and this forms a deposit 80 over the inner surface of the mold halves, as explained. FIGURE 13 shows the deposits 80 in the bottom and top halves of a mold. The rims 53 and 54 are stepped outwardly at complementary angles. When the two halves are brought together, the two angular surfaces form a tight fit with one another, and the two deposits 80 are pressed into contact with a minimum bulge 81 of the plastic at the seam. This bulge is not sufficient to materially affect the balance of the completed ball.

Figure 11:
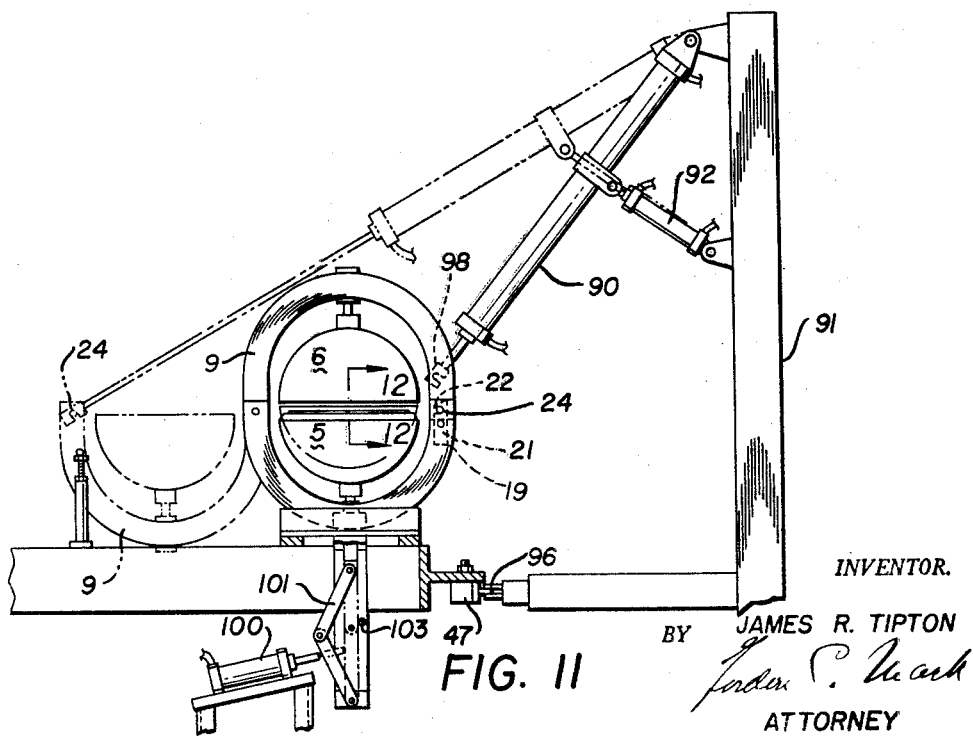
FIG. 11 is a section on the line 11—11 of FIG. 1 showing the mold-closing means.
Figure 12:
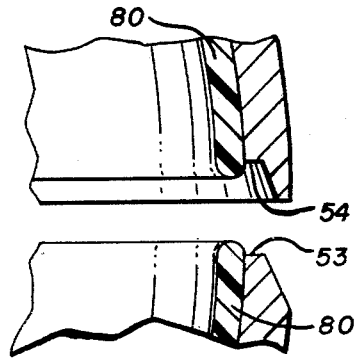
FIG. 12 is a detailed section showing the edge of the two mold halves almost closed.

Any suitable means for bringing the two halves together may be employed. FIGURE 11 shows a long air cylinder 90 angling downwardly from the support 91 and spaced from it by the air cylinder 92. The air cylinders are activated by the block 47 which trips the switch 96. By the conjoint action of the two air cylinders, the hook 98 at the end of the piston rod of the cylinder 90 reaches out and engages the stud 24 on the open fixture half 9. The pistons of both the cylinders 90 and 92 are then withdrawn by timed mechanism, to close the fixture halves. The mold halves are not brought together until the bottom mold half 5 is raised by the piston of the cylinder 100 straightening the knuckle joint 101. Closing the mold in this manner produces less wear on the mold rims than if the mold halves were hinged together. The stop pin 103 limits the movement of the knuckle joint. The joint is deadlocked and holds the mold halves in contact until they are opened, when the deadlock can be broken manually or automatically. The cylinder is operated by timing mechanism actuated by switch 96.

Figure 14:
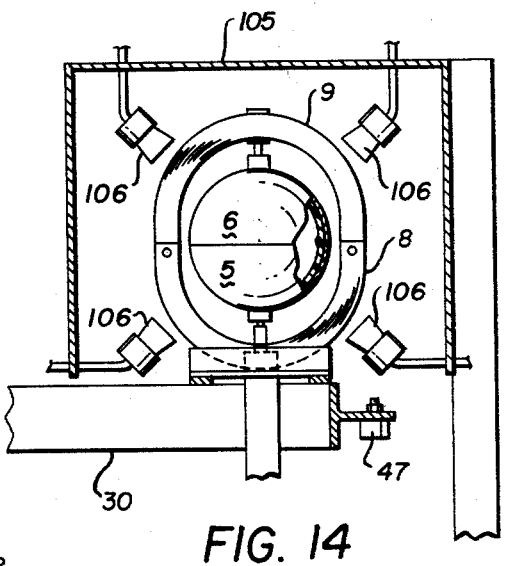
FIG. 14 is a section on the line 14—14 of FIG. 1 through the interior of the fusion tunnel.
Figure 15:
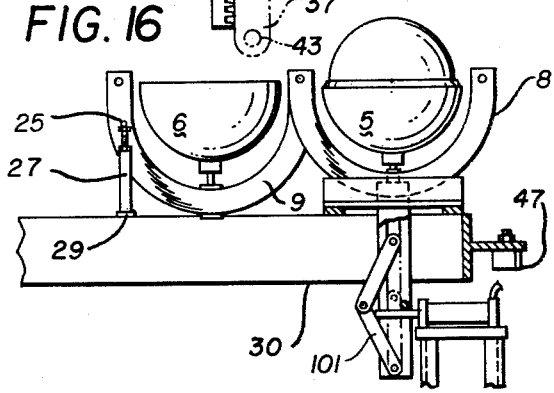
FIG. 15 is a section on the line 15—15 of FIG. 1 showing the cooled mold open with the finished ball inside of it.

When the mold has been closed the wheel carries it through the fusion tunnel 15. Here gas burners 106 (FIGURE 14) or other suitable heating means heat the closed mold from the outside and fuse the plastisol. The seam fuses the two halves of the ball together and the valve is sealed to the inside of the ball.

From the fusing tunnel the wheel carries the closed mold into the cooling tunnel 110. Here the mold is cooled by water mist or by air or other suitable cooling means. The inside of the cooling tunnel need not look too different from the inside of the fusion tunnel shown in FIGURE 14, except that the heating means are replaced by cooling means. It is necessary to cool the ball before the mold is opened because the heated air within the ball would expand and stretch the ball if the mold were opened without cooling.

The mold can be opened manually by lifting the upper fixture half by means of the pin 27 or otherwise, and at the same time breaking the knuckle joint 101 so that the lower half of the mold drops in the lower fixture half, bringing the rims of the mold halves level with one another. The ball is removed manually or automatically, and is subsequently inflated through an inflating needle inserted through the ball at the valve before it is shipped. The open mold then again passes through the pre-heating tunnel 51 and the cycle is repeated.

Various plastisols may be used in the manufacture of balls, and somewhat different temperatures, etc. can be employed; so the following is illustrative. The plastisol may be formed of polyvinyl chloride, but non-vinyl plastics can be used. It is usually formed from a copolymer of vinyl chloride and vinyl acetate or vinylidene chloride. The following formula refers to the latter type of plastisol:

| | Parts by weight |
|---|---|
| Vinyl polymer | 100 |
| Stabilizer [1] | 2.5 to 3.5 |
| Primary plasticizer | 50 |
| Secondary plasticizer | 25 to 35 |
| Viscosity depressant | 1 to 3 |

[1] Barium, cadmium, or zinc stabilizer.

The primary plasticizer may, for example, be dioctyl phthalate. The secondary plasticizer may be dioctyl adipate. It is to be understood that different plasticizers, etc. may be utilized.

The plastisol selected for illustration starts to gell at 180° F. In the pre-heating tunnel, the mold halves are heated until their rims are about 270–280° F. (outside temperature) and the bottom of the mold is about twenty degrees lower.

If the walls of the mold are made of aluminum and are about ¼-inch thick, the plastisol requires about one minute to gel. If such walls are ⅜-inch thick, about oneand-one-half minutes is required to gel the plastisol. The dwell time of the wheel at each station is eight or nine seconds, and it takes four to five seconds for the wheel to move from one station to the next. With sixty-six stations, as indicated in the drawing, it takes about 13 to 13.5 minutes for a complete cycle. The thickness of the wall of the ball can be increased or decreased by changing the composition of the plastisol, or by increasing or decreasing the dwell time of the plastisol in the heated mold (either by changing the speed of rotation of the wheel or the spacing between the filling and suction stations), or by increasing or decreasing the temperature of the mold halves.

In the fusion tunnel 105 the molds must be heated to 350 to 370° F., which usually requires four to five minutes in the fusion tunnel. Gas heaters are desirable, but other infrared or other heaters may be utilized.

Before opening, the molds are cooled to 120–150° F.

A further formula for a polyvinyl chloride plastisol which can be operated under the foregoing conditions for the manufacture of balls is

|  | Pounds | Ounces |
|---|---|---|
| Dioctyl phthalate | 15 | 1 |
| Dioctyl adipate | 10 | 5 |
| S-73 (Epoxy plasticizer) | 2 | 6 |
| HB-40 [1] | 4 | 1 |
| PVC Paste Resin | 43 | 0 |
| Stabilizer [2] | 1 | 3 |
| Inert filler | 6 | 7 |

[1] Secondary plasticizer: hydrogenated terphenyls.
[2] Cadmium-barium-zinc complex.

The formula employed is not critical.

Although the filling and suction mechanism are shown as being stationary, they may be arranged to move with the wheel and be returned to their starting positions after each such movement.

It is not necessary that the mold halves open upwardly while being heated. They can be turned down or faced toward one another, or away from one another.

The molds should be filled immediately after heating, and the plastisol should be introduced as rapidly as possible. The measuring device must be accurate and it is preferably of the type which can readily be adjusted for delivery of different amounts of plastisol so that the same equipment can be used for the manufacture of articles requiring different amounts of plastisol.

The anti-drip valves 62 have spring-loaded hinged gates which are normally closed, but are opened when a head of plastisol under the pressure employed is sufficient to open them. The spring closes each valve when the pressure is not adequate to keep it open. Different types of valves may be used and any suitable means for operating them may be employed.

The equipment and specific process disclosed are illustrative. The invention is covered in the claims which follow.

What I claim is:

1. The process of making a vinyl product using two open metal molds with horizontal mating rims, which comprises heating the rims of the molds, filling both molds with vinyl plastisol to a level above the rims whereby a gel deposit is formed on the inner surface of each part and internally above the rim of each, removing the excess plastisol from each mold by suction without any plastisol contacting the rims of the two mold parts, and then bringing the two mold parts together and uniting the deposits of gelled plastisol formed above the rims, and thereafter fusing the plastisol into a unitary whole.

2. The process of forming a ball which comprises filling two mold halves with plastisol and forming a meniscus of plastisol above the rim of each heating to gel the plastisol which forms the meniscus while moving the respective halves so filled to suction means by starting slowly from a stationary position and then after more rapid movement gradually coming to a stop in order to prevent the movement of the mold halves from causing the plastisol to wet their rim and sucking ungelled plastisol from within said gelled meniscus in each mold half by said suction means.

3. The method of forming a vinyl plastic product in an open mold with a planar rim on a continuous conveyor which comprises moving the mold past a heating station where the mold is heated, then past a filling station and there introducing plastisol into the heated mold and forming a meniscus thereover, the plastisol thereby forming a gel over the heated surface and around the perimeter of the meniscus, then past a vacuum station and there removing ungelled plastisol from the opening in the mold by suction, and then past heating means and there fusing the plastisol and moving the mold from a stationary position at each station to the next station by first gradually imparting motion thereto and then after more rapid movement gradually bringing the mold to a stop whereby the plastisol forming the meniscus is not caused to overflow onto the rim of the mold.

4. The process of forming a hollow ball in a metal open mold composed of two matable halves with planar rims around the openings in the respective halves, which process comprises supporting the halves upright with the rim thereof horizontal, heating the halves by radiating heat thereon from above and thereby heating the rims and portions adjacent thereto to a higher temperature than the bottoms of the molds with the temperature of the walls of the respective halves gradually diminishing from said rims to said bottoms, filling vinyl plastisol into the two halves and producing a meniscus of the plastisol above and internally of the planar rim of each, removing most of the ungelled plastisol from each mold half and thereafter removing additional plastisol including plastisol which drains from the gel deposits after said first removal of plastisol, and by such procedure producing a plastisol deposit of substantially uniform thickness on each mold half by maintaining the plastisol in contact with the portions adjacent the rims of the respective mold halves for a shorter time than it is in contact with the bottoms thereof to compensate for heating the wall of each mold half to different temperatures, and thereafter bringing the mold halves together and thereby uniting the deposits in the respective mold halves.

References Cited in the file of this patent

UNITED STATES PATENTS

| 246,161 | Ligowsky | Aug. 23, 1881 |
| 1,531,505 | Roberts | Mar. 31, 1925 |
| 1,941,802 | Howell | Jan. 2, 1934 |
| 2,379,793 | Eenigenburg | July 3, 1945 |
| 2,473,722 | Nelson | June 21, 1949 |
| 2,588,571 | Porter | Mar. 11, 1952 |
| 2,683,286 | Lenhart | July 13, 1954 |
| 2,688,158 | Stratton | Sept. 7, 1954 |
| 2,885,733 | Chupa | May 12, 1959 |
| 2,923,029 | Harris et al. | Feb. 2, 1960 |
| 2,923,032 | Miller et al. | Feb. 2, 1960 |
| 2,929,104 | Hutton | Mar. 22, 1960 |
| 2,974,373 | Streed et al. | Mar. 14, 1961 |

OTHER REFERENCES

Modern Plastics, October 1950, pages 101–104.